United States Patent [19]

Fulghum, Jr.

[11] 4,240,588

[45] Dec. 23, 1980

[54] WOOD CHIPPING INSTALLATION

[75] Inventor: Oscar T. Fulghum, Jr., Wadley, Ga.

[73] Assignee: Fulghum Industries, Inc., Wadley, Ga.

[21] Appl. No.: 17,956

[22] Filed: Mar. 6, 1979

[51] Int. Cl.³ .............................................. B02C 18/22
[52] U.S. Cl. .................................. 241/80; 144/162 R; 144/163; 144/176; 209/316; 209/674; 209/920; 241/97; 241/278 R; 241/81
[58] Field of Search ........................ 241/24, 28, 80, 81, 241/92, 101.7, 278 R, 97, 96; 209/311, 315, 316, 317, 674, 682, 920; 144/162 R, 163, 172, 173, 174, 176, 326 A, 326 B, 326 C

[56] References Cited

U.S. PATENT DOCUMENTS

| | | | |
|---|---|---|---|
| 1,403,326 | 1/1922 | Jacobsen | 209/317 |
| 2,596,015 | 5/1952 | Dunwody | 241/92 X |
| 3,069,101 | 12/1962 | Wexell | 241/28 X |
| 3,337,139 | 8/1967 | Lloyd et al. | 241/24 X |
| 3,409,235 | 11/1968 | Quinn | 241/80 X |
| 3,425,552 | 2/1969 | Curtis | 209/317 X |
| 3,570,773 | 3/1971 | Schneider | 241/81 |
| 3,783,916 | 1/1974 | Nicholson et al. | 144/162 R |
| 3,866,843 | 2/1975 | Lunn | 241/92 |
| 4,050,980 | 9/1977 | Schmidt et al. | 241/24 |
| 4,156,508 | 5/1979 | Kisielewski | 241/80 |

*Primary Examiner*—W. Donald Bray
*Attorney, Agent, or Firm*—Cushman, Darby & Cushman

[57] ABSTRACT

An improved wood chipping installation of reduced overall height has conveyor means for feeding wood pieces to a chipping machine. The conveyor means includes a conveyor type screening device for separating proper size chips from oversize chips. Means are provided for transferring material chipped by the chipping machine back to the infeed end of the screening device so that oversize chips are fed by the conveyor, along with other wood pieces, back into the chipping machine while proper size chips and fines are separated out.

10 Claims, 5 Drawing Figures

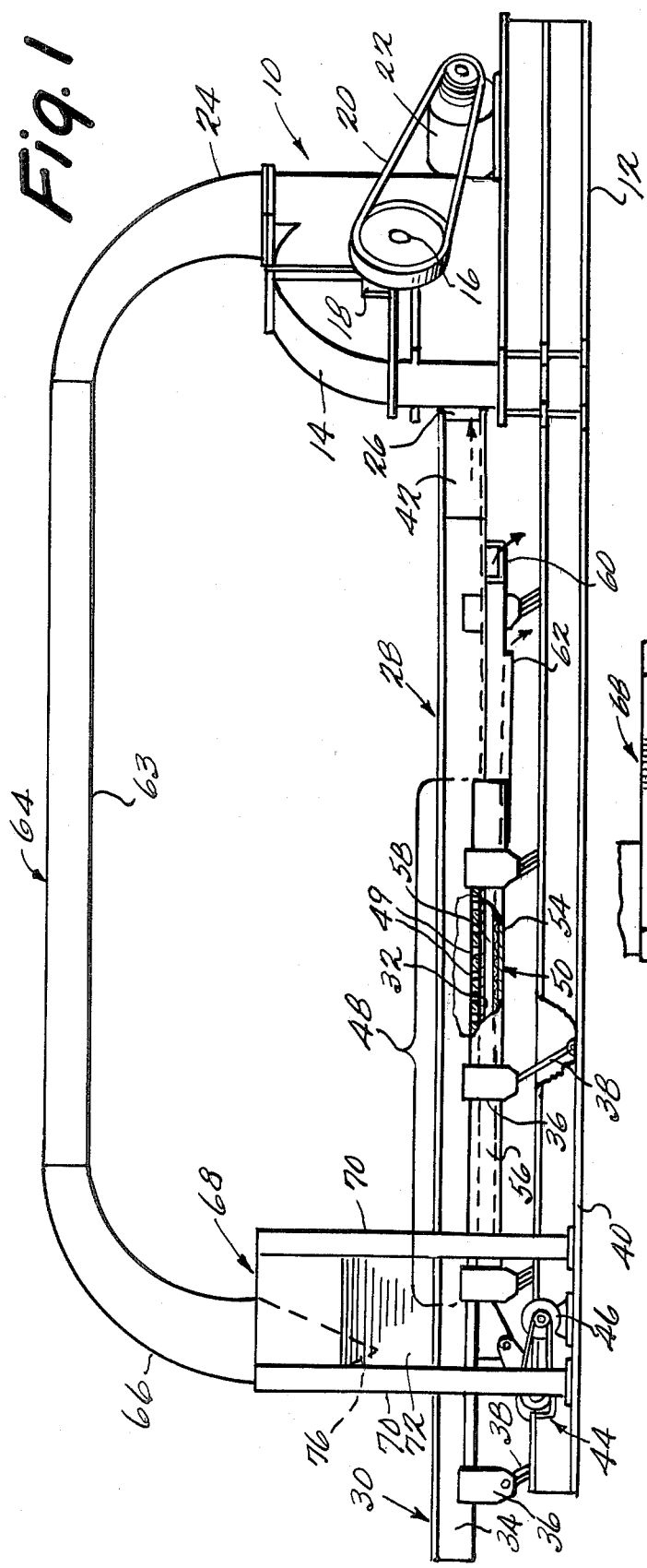

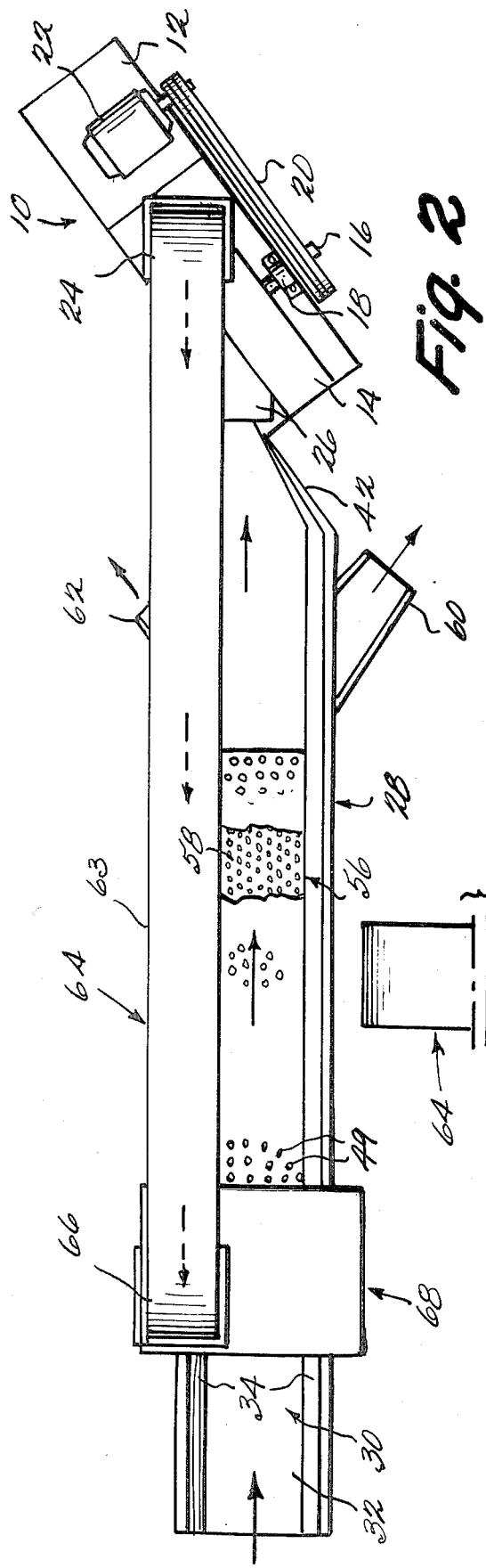
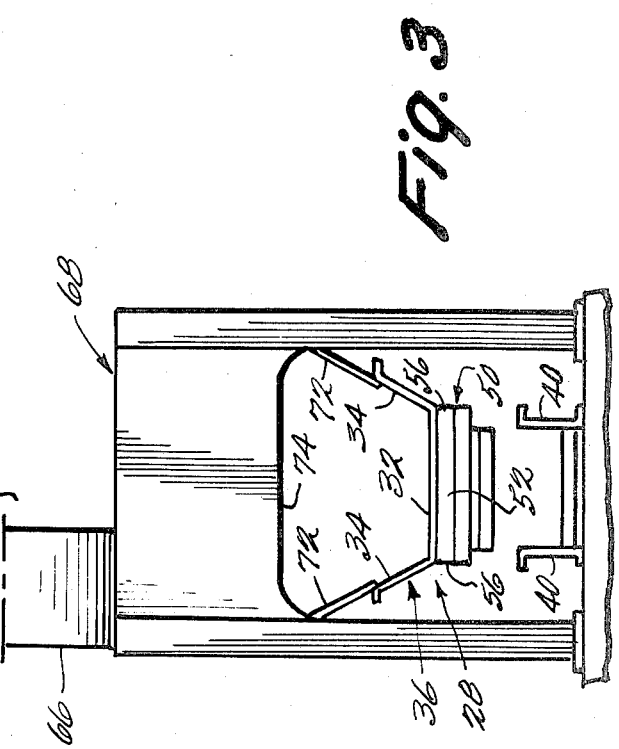

WOOD CHIPPING INSTALLATION

FIELD OF THE INVENTION

This invention relates to wood chipping installations and, more particularly, to improvements in such installations.

BACKGROUND OF THE INVENTION

Present wood chipping installations are exemplified by the disclosure of U.S. Pat. No. 3,069,101 to Wexell, dated Dec. 18, 1962. Such installations include a wood chipping machine having a chipper disc which is driven for rotation on a horizontal axis and carries on one face a plurality of cutter or chipper knives or blades. Pieces of wood to be chipped, such as logs or slabs, edgings or trim ends from a sawmill are fed at an acute angle to the disc, usually on some type of horizontal conveyor into a horizontal infeed chute or spout on the machine. The chipper disc also usually is provided with centrifugal fan blades, and a housing enclosing the disc is provided with a discharge outlet which communicates with a blowpipe that directs the air-entrained chipped material to a separating device. Such separating device usually has a plurality of vibrating screens which separate proper or desired size chips from oversize chips and from fines. Means normally are provided for conveying the oversize chips back to the chipping machine for rechipping.

In an installation of the foregoing type the separating device usually is located at an elevation considerably higher than the top of the chipping machine so that the oversize chips can be conveyed by gravity, i.e. without further elevation, back to the machine. While such installations are satisfactory, improvements are possible and desirable for resulting savings in construction and operation.

SUMMARY OF THE INVENTION

It is, therefore, an object of this invention to provide an improved wood chipping installation wherein the overall height is reduced as compared to known installations, with resultingly reduced installation and manufacturing costs.

It is a further object of this invention to provide such an improved wood chipping installation which can process the output of a relatively large sawmill.

The foregoing objects are accomplished by providing conveyor means for feeding wood pieces to the chipping machine which includes a conveyor type screening device for separating proper size chips from oversize chips and providing means for transferring material chipped by the chipping machine back to the infeed end of the separating device so that oversize pieces are fed by the feeding means, along with other wood pieces, into the chipping machine while proper size chips and fines are separated out.

The foregoing arrangement is suitable for relatively low production, but a modified arrangement will accommodate the output of a larger sawmill. The modified arrangement includes a second conveyor type separating device which overlies the first and is adapted to separate proper size chips and fines and allow them to fall upon the first separating device while oversize chips on the second device are fed to the outfeed end of the conveyor means to be fed back into the chipping machine along with other wood pieces. In the modified arrangement the transferring means discharges chipped material from the machine on the infeed end of the second separating device.

Other objects of the invention will become apparent from the following detailed description and accompanying drawings.

BRIEF DESCRIPTION OF THE DRAWINGS

FIG. 1 is a side elevational view, with parts broken away, of a wood chipping installation embodying this invention.

FIG. 2 is a plan view of the installation shown in FIG. 1 with parts broken away.

FIG. 3 is a left end view of the installation shown in FIG. 1.

FIG. 5 is a left end view of the installation shown in FIG. 4.

DETAILED DESCRIPTION OF THE INVENTION

Figure 4:
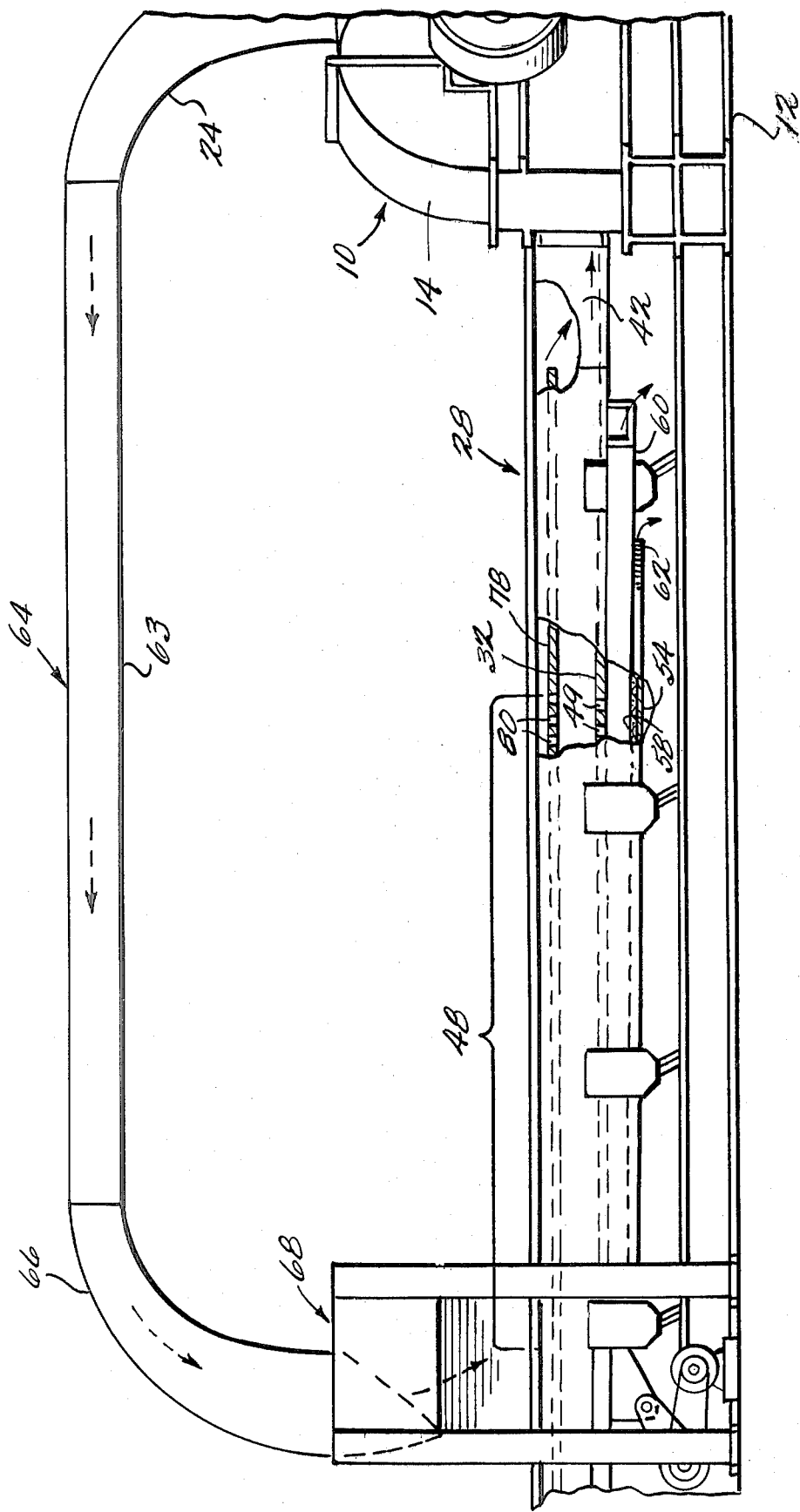
FIG. 4 is a view corresponding to FIG. 1 showing a modification of the invention.

Referring now to FIGS. 1–3 of the drawings, there is shown a conventional chipping machine 10 generally of the type described and illustrated in the aforesaid U.S. Pat. No. 3,069,101. The machine 10 includes a base 12 and a housing 14 enclosing a knife-carrying chipper disc (not shown) which is mounted for rotation on a horizontal shaft 16 journalled in exterior bearings 18. The disc is driven by a belt drive 20 from an appropriate motor 22 mounted on the base 12. Preferably, the disc also carries suitable centrifugal fan blades (not shown) for blowing air and entrained chipped material upwardly through a discharge opening duct 24 at the top of the housing 14. On its front face the housing 14 is provided with a horizontal infeed spout or chute 26 through which elongated wood pieces to be chipped are fed generally horizontally at an acute angle to the plane of rotation of the chipper disc so that the cutter knives carried by the disc will cut bias slabs from the wood pieces which will disintegrate into wood chips.

Wood pieces to be chipped, such as logs or slabs, edgings, or trim pieces from a sawmill usually are fed into the infeed spout or chute 26 by a conveyor of a conventional type, e.g. a belt conveyor. In the arrangement embodying this invention, however, wood pieces to be chipped are fed into the infeed spout or chute 26 by a conveyor 28 which incorporates means for separating or screening out proper size chips and fines from the material being fed into the chipping machine 10. The conveyor 28 is in the form of a generally horizontally disposed trough 30 aligned with the infeed spout or chute 26 of the chipping machine 10 and extending at an acute angle, such as about 38°, to the plane of rotation of the chipping disc. The trough 30 has a flat bottom 32 and outwardly inclined side walls 34. Depending from the trough 30 are a plurality of pairs of supporting brackets 36 to which are secured, as by welding, inclined depending flexible webs or legs 38 secured at their lower ends, as by welding, to spaced frame members 40 which serve as a foundation for the conveyor 28. At the outfeed end of the trough 30 the bottom 32 tapers and the side walls 34 converge to form an outfeed spout 42 which slideably fits within the infeet spout or chute 26 of the chipping machine 10. An appropriate eccentric mechanism 44, driven by an appropriate motor 46, for driving the trough 30 with a shaking or vibrating reciprocating movement is mounted on the foundation frame 40 beneath and adjacent the infeed end of the trough.

An intermediate section 48 (FIG. 1) of the trough 30 includes means for separating or screening out proper size chips and fines from material being fed to the machine 10. For this purpose the bottom 32 of the trough section 48 is provided with screening perforations 49 of a desired size such as of the order of about 2" in diameter, so as to allow chips of a desired proper size or smaller to fall therethrough. The separating means also includes an underlying trough or section 50 having a front wall 52, a flat bottom 54, and upright sides 56 secured to the lower edges of the inclined side walls 34 of the trough 30. Disposed above the bottom 54 of the underlying trough section 50 is a perforated screen 58 having perforations of a desired size, such as of the order of about ¼" or 5/16" in diameter, so as to allow fines to fall therethrough and become separated from the chips of proper size which fall into the underlying trough section 50. The screen 58 may be located, for example, at about 6" below the trough bottom 32 and about 2" above the bottom 54 of trough section 50.

At its outfeed end the underlying trough section 50 is provided with a laterally inclined discharge spout 60 having its bottom aligned with the screen 58 so as to discharge chips of proper size laterally to one side of the conveyor 28 from whence they may be transferred by any appropriate means, such as a belt conveyor (not shown), to a desired collection point. Similarly, the outfeed end of the trough section 50 is provided with another discharge spout 62 inclined laterally oppositedly from the spout 60 and having its bottom aligned with the trough section bottom 54 so as to discharge fines laterally to the other side of the conveyor 28 from whence they may be transferred by any appropriate means, such as a belt conveyor (not shown), to a desired collection point.

In accordance with this invention all the material chipped by the chipping machine 10 is returned to the conveyor 28. For this purpose the discharge conduit 24 of the machine 10 curves upwardly toward the infeed end of the conveyor 28 and is connected to a horizontal section 63 of a blowpipe 64 which extends over and along the conveyor 28 and is connected to a downwardly curving discharge section 66 which depends into one corner of an open-topped four-sided chute 68 supported on posts 70 over the conveyor 28 at the infeed end of conveyor section 48. The lower portions 72 of the side walls of the chute 68 converge downwardly and inwardly to overlap the upper edge portions of the inclined side walls 34 of the trough 30. The front and back walls of the chute 68 are cut away, as at 74 (FIG. 3), so as to allow logs, slabs and edgings to pass through the chute while chipped material discharged from the blowpipe 64 falls into the trough 30. The wall of the discharge section 66 fartherest from the chipping machine 10 is extended downwardly and forwardly in a smooth curve, as at 76, into the chute 68 so as to direct the chipped material with somewhat forward momentum into the trough 30. The open top of the chute 68, combined with the cutaway portions 74 of the front and back walls thereof, provide for ready separation of entraining air from the chipped material.

A conventional chipping machine 10 of the type used in an installation embodying this invention has a chipping disc of the order of about 4' in diameter, while the overall height of the machine, including the housing 14 and base 12, may be of the order of about 6'2", while the overall height of the installation, including the blowpipe 64, may be of the order of about 10'. The conveyor 28 may have a length of about 30' with the length of the screening device 48 being about 10'.

In operation wood pieces to be chipped, in the form of logs or slabs, edgings, trim ends, or the like, from a sawmill, are appropriately fed into the infeed end of the conveyor 28, as by a suitable belt conveyor (not shown). During operation all material chipped by the chipping machine 10 is fed onto the conveyor 28 on top of and between the aforementioned wood pieces. As these pieces, together with the chipped material, proceed over the screening means 49 and 58 incorporated in the conveyor 28, both fines and chips of proper size fall into the underlying trough section 50 and are removed from the conveyor. Further, the screening means 58 separates chips of proper size from fines and delivers chips of proper size to one side of the conveyor 28 and fines to the other side. Meanwhile, oversize chips are delivered by the conveyor 28 back into the chipping machine 10 for rechipping along with the aforementioned wood pieces.

The aforementioned installation can process only a limited amount of infeed wood pieces because if the amount is too large the wood pieces, along with the oversize chips, overlie and block the screening perforations 49 in the bottom 32 of the trough section 48 to such an extent as to hinder proper separation of chips of proper size and smaller from the remaining material on the conveyor 28. A considerably increased amount of infeed wood pieces can be processed, however, by the modification of the invention illustrated in FIGS. 4 and 5. As shown therein, the conveyor 28 includes a bottom 78 overlying bottom 32 supported by and between the side walls 34 at an elevation above the bottom 32 sufficient to prevent interference with logs etc. carried thereon. The overlying bottom 78 extends from beneath the chute 68 to a point above and just in advance of the outfeed spout 42 of the conveyor 28. That portion of the overlying bottom 78 which overlies the screening section 48 of the trough 30 is provided with perforations 80 of a desired size, such as of the order of about 2" in diameter, to separate proper size chips and fines, from oversize chipped material and allow the former to drop onto the bottom 32 of the conveyor 28. At the outfeed end of the bottom 78 the oversize chipped material is deposited onto the outfeed spout 42 of the conveyor 28. It will be seen that the side walls 34 of the conveyor 28 may be raised somewhat and the discharge end of the curved section 68 of the blowpipe 64 shortened or the blowpipe raised somewhat to accommodate the overlying bottom 78, while the cutouts 74 in the front and back walls of the chute 68 are likewise raised for such accommodation.

In the modified installation of this invention shown in FIG. 4, wood chips of proper size, along with fines, are separated from oversize chips on the screening section of the overlying bottom 78 and are deposited on top of and between wood pieces being fed by the trough 30. The screening section of the bottom 78 performs the same separating action described above for chips of proper size and fines, while oversized chips are not deposited on the trough bottom 32 until just in advance of the infeed spout or chute 26 of the chipping machine 10 to thus reduce clogging of the screening section 48 of the trough bottom 32 and consequently permit infeed of a greater amount of wood pieces.

It thus will be seen that the objects of this invention have been fully and effectively accomplished. It will be realized, however, that the specific embodiment shown and described is susceptible to modification without departure from the principles of the invention. For example, the overlying bottom could be replaced by separating and conveying means completely independent of the conveyor 28, but it is more economical to construct the overlying bottom as a part of the conveyor 28. Hence, the invention encompasses all modifications within the spirit and scope of the following claims.

What is claimed is:

1. A wood chipping installation comprising:
   a chipping machine having a knife-carrying chipper disc rotating on a horizontal axis;
   conveyor means for feeding wood pieces to be chipped generally horizontally into said machine at an acute angle to the plane of said disc, said conveyor means including screening means for separating chips of predetermined size and smaller chips from the material being fed to said machine by said conveyor means; and
   means for transferring material chipped by said machine to said conveyor means in advance of said screening means, whereby chipped material larger than the predetermined size is fed to said machine for rechipping along with other wood pieces.

2. The installation defined in claim 1 in which the screening means includes means for separating the predetermined size chips from smaller chips.

3. The installation defined in claim 1 in which the conveyor means is of the vibrating type.

4. The installation defined in claim 1 in which the disc carries centrifugal fan blades and the transferring means includes a blowpipe.

5. The installation defined in claim 1 in which the conveyor means comprises vibrating trough means and the screening means comprises a trough means section having a perforated bottom.

6. The installation defined in claim 5 including an open-topped chute supported over the trough means and wherein the disc carries centrifugal fan blades and the transferring means includes a blowpipe discharging into said chute.

7. The installation defined in claim 1 in which the conveyor means has an outfeed end adjacent the machine and the screening means includes means for conveying chipped material larger than the predetermined size to said outfeed end separately from the other wood pieces.

8. A wood chipping installation comprising:
   a chipping machine having a knife-carrying chipper disc rotating on a horizontal axis and a generally horizontal infeed chute;
   conveyor means having an outfeed end adjacent said machine for feeding wood pieces to be chipped generally horizontally into said chute at an acute angle to the plane of said disc, said conveyor means including screening means for separating chips of predetermined size and smaller chips from the material being fed to said machine by said conveyor means, said screening means including a section having an infeed end and overlying a portion of the path of travel of the wood pieces being fed to said machine for depositing chipped material larger than the predetermined size into said path adjacent said outfeed end of said conveyor means; and
   means for transferring chipped material from said machine to said conveyor means at said infeed end of saaid overlying section of said screening means, whereby chipped material larger than the predetermined size to be fed to said machine for rechipping is conveyed to said outfeed end of said conveyor means substantially separately from other wood pieces.

9. The installation defined in claim 8 in which the conveyor means comprises vibrating trough means and the screening means comprises perforated bottom sections of said trough means.

10. A wood chipping installation comprising:
    a chipping machine having a knife-carrying chipper disc rotating on a horizontal axis and a generally horizontal infeed chute;
    first conveyor means having an outfeed end adjacent said machine for feeding wood pieces to be chipped generally horizontally into said chute at an acute angle to the plane of said disc, said first conveyor means including screening means located along the path of travel of the wood pieces for separating chips of predetermined size and smaller chips from the material being fed to said machine;
    second conveyor means having an infeed end and overlying said first conveyor means and having means for separating chips of the predetermined size and smaller chips and allowing them to fall on said screening means while depositing chipped material larger than the predetermined size into said path adjacent said outfeed end of said first conveyor means; and
    means for transferring chipped material from said machine to said infeed end of said second conveyor means, whereby chipped material larger than the predetermined size is fed to said machine for rechipping substantially separately from other wood pieces.

* * * * *